April 21, 1925.

H. E. RIEHL

AMUSEMENT APPARATUS

Filed June 2, 1923

WITNESSES

E. B. Marshall

INVENTOR
HENRY ELMER RIEHL
BY Munn & Co
ATTORNEYS

April 21, 1925.  1,534,285
H. E. RIEHL
AMUSEMENT APPARATUS
Filed June 2, 1923  2 Sheets-Sheet 2
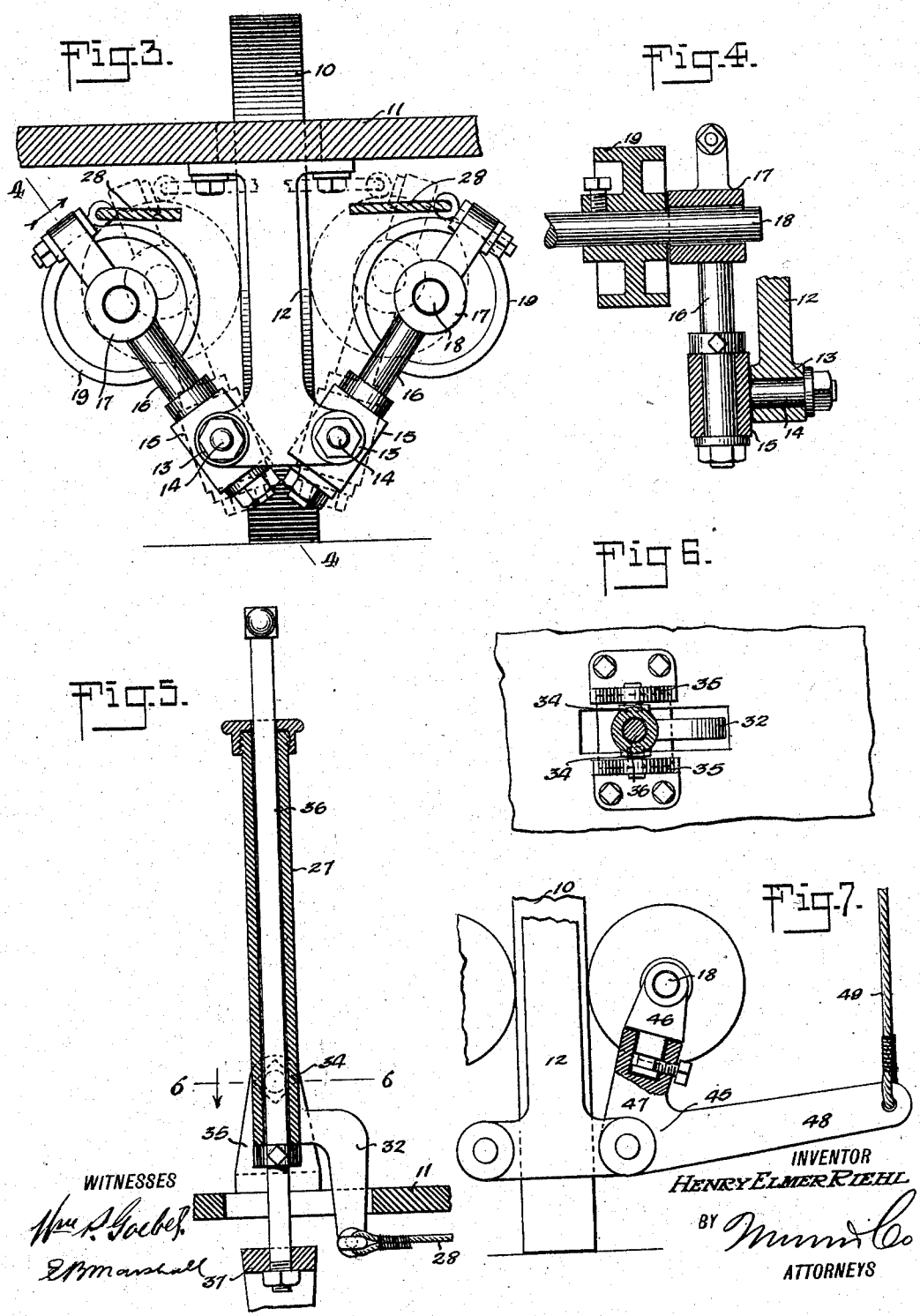

Patented Apr. 21, 1925.

1,534,285

UNITED STATES PATENT OFFICE.

HENRY ELMER RIEHL, OF BROOKLYN, NEW YORK.

AMUSEMENT APPARATUS.

Application filed June 2, 1923. Serial No. 643,042.

*To all whom it may concern:*

Be it known that I, HENRY ELMER RIEHL, a citizen of the United States, and a resident of the city of New York, borough of Brooklyn, in the county of Kings and State of New York, United States of America, have invented a new and Improved Amusement Apparatus, of which the following is a full, clear, and exact description.

My invention has for its object to provide an amusement apparatus consisting of a vehicle which has an electric drive controllable by means connected with a steering means with which the vehicle is provided.

Another object of the invention is to provide power driven friction discs for operatively engaging a traction wheel, the discs being mounted on pivoted arms which permits a movement of the arms by means provided to bring the discs into operative position.

Still another object of the invention is to connect the pivoted arms by cables with a pivoted steering column so that the pivoted arms with the power driven discs may be actuated by a movement of the steering column.

Additional objects of the invention will appear in the following specification in which the preferred form of my invention is described.

In the drawings similar reference characters refer to similar parts in all the views, in which Figure 1 is an inverted plan view of the vehicle;

Fig. 3 is an enlarged sectional view on the line 3—3 of Fig. 1;

Fig. 4 is a sectional view on the line 4—4 of Fig. 3;

Fig. 5 is an enlarged sectional view showing the steering column pivotally mounted;

Fig. 6 is a sectional view on the line 6—6 of Fig. 5;

Fig. 7 is an enlarged fragmentary view showing the modified form of the invention.

It will be understood that this invention relates to an amusement apparatus in which a vehicle is to be electrically driven, the vehicle being connected electrically with a conductive surface on which the vehicle travels and with an overhead wire netting through a trolley pole on the vehicle.

Figure 2:
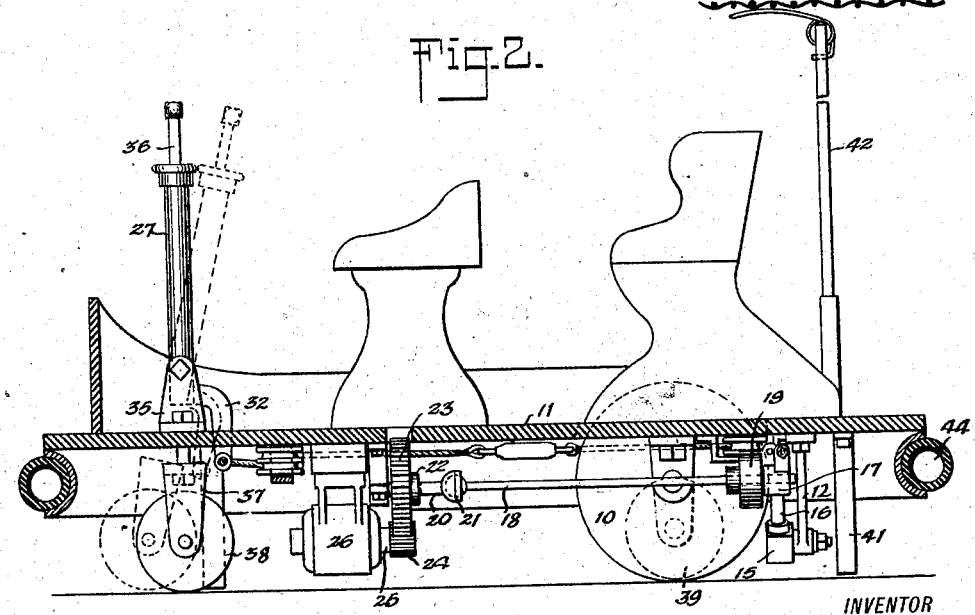
Fig. 2 is a sectional view on the line 2—2 of Fig. 1.

By referring to the drawings it will be seen that a traction wheel 10 is mounted on the body 11, and that depending from this body 11 there is a bracket 12 which is disposed in the plane of movement of the traction wheel 10. This is best shown in Fig. 3 of the drawings. The bracket 12 has two bearings 13 in each of which is journaled a stud 14 mounted on a bearing 15 in which an arm 16 is journaled. It will be seen that by the means provided each of the arms 16 is connected to the bracket 12 by a universal joint formed by the two bearings referred to, the arms 16 diverging upwardly as is best illustrated in Fig. 3 of the drawings. Mounted on the upper end of each arm 16 there is a bearing 17, the shafts 18 being journaled in these bearings 17. Secured for rotating with the shafts 18 there are friction discs 19, the friction discs 19 being disposed one at each side of the traction wheel 10 so when they engage the traction wheel 10 they will rotate the latter. The shafts 18 are connected with the shafts 20 by universal joints 21, the shafts 20 being journaled in bearings 22 secured to the body of the vehicle. Mounted on the shafts 20, there are gears 23 which are engaged by the gear wheel 24 secured to the shaft 25 of the motor 26, the motor 26 being secured to the underside of the body 11 and depending therefrom as indicated in Fig. 2 of the drawings.

By the means described it will be understood that when the motor 26 is rotated and the friction discs 19 engage the traction wheel 10 that the vehicle will be driven. The bearings forming the universal joints connecting the arms 16 with the bracket 12 permit of the movement of the shafts 18 relatively to the shafts 20 without the shafts 18 binding in the bearings 17.

The arms 16 are moved inwardly by means connected with the steering column 27, cables 28 being provided which are secured to the upper ends of the arms 16 and which extend in opposite directions and around pulleys 29 and 30, the cables then extending around pulleys 31 in opposite directions and to the arm 32 extending from the steering column 27. If desired, the cables 28 may be parted between the pulleys 29 and 30 and turn-buckles 33 may be introduced. The steering column 27 is pivoted at 34 to brackets 35 and when the steering column 27 is moved rearwardly as indicated by the dotted lines in Fig. 2 of the drawings, the arm 32 will be moved forwardly to draw on the cables 28 and move the upper ends of the arms 16 inwardly with the result that the friction disc 19 will engage the sides of the traction wheel 10. When the steering column 27 is moved forwardly the weight of the discs and the arms 16 will cause the upper ends of the arms 16 to move out of engagement with the traction wheel 10 as indicated by the full lines in Fig. 3 of the drawings.

In the steering column 27 there is a steering shaft 36 on which is mounted a bracket 37 in which a steering wheel is journaled.

Figure 1:
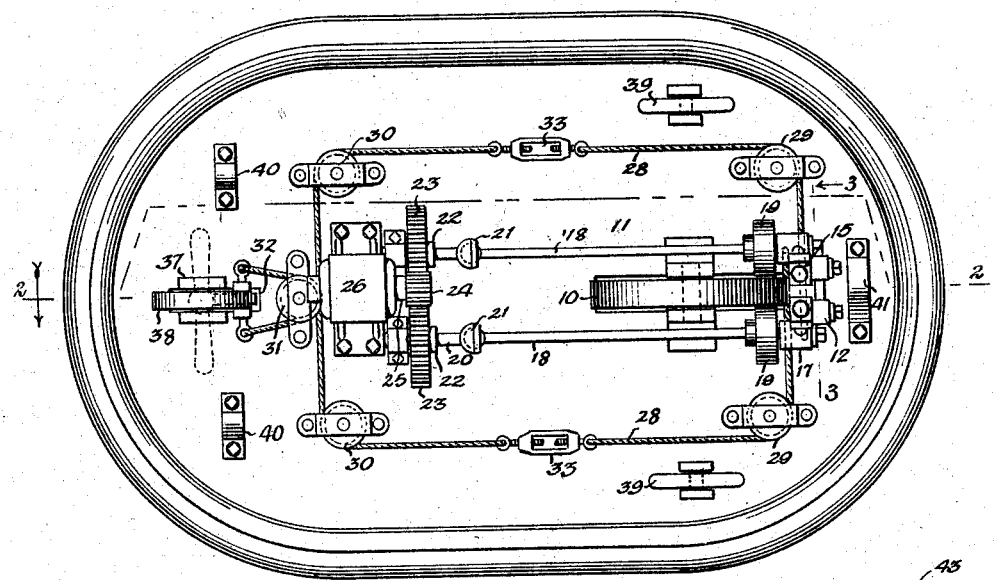

It will be seen by referring to Fig. 1 of the drawings that auxiliary wheels 39 are disposed one at each side of the traction wheel 10 but it may be stated that when the vehicle is in operation under the best conditions that these auxiliary wheels 39 will not touch the conductive surface on which the vehicle travels. As an additional means to prevent the vehicle from falling to one side, brackets 40 are provided and a bracket 41 is also provided which is disposed at the rear of the traction wheel 10 to prevent the vehicle from tilting rearwardly.

As has been explained, the power is conveyed to the motor on the vehicle through the conductive surface on which the vehicle travels which may be conveyed through the traction wheel or through another part of the vehicle and the other contact is made by the trolley pole 42 which engages the overhead wire netting 43.

The body 11 of the vehicle is oval in shape as will be seen by Fig. 1 of the drawings and the periphery is fashioned to receive a cushioning member 44 which will prevent shocks and jars when two of the vehicles collide.

In the modified form of the invention shown in Fig. 7 of the drawings, bell crank levers 45 are pivoted, one at each side of the bracket 12 and bearings 46 are pivotally mounted on the arms 47 of the bell crank levers 45. The shafts 18 are journaled in the bearings 46; secured to the arms 48 of the bell crank levers 45 there are cables 49 which are disposed around pulleys and are secured to the arm 32 of the steering column 27 in the manner described.

Having thus described my invention what I claim as new and desire to protect by Letters Patent is:

1. In a vehicle having a supporting traction wheel, an arm disposed at the side of the traction wheel, the arm being pivoted at its lower end and extending upwardly and outwardly relatively to the traction wheel, a bearing at the upper end of the arm, a shaft journaled in the bearing, a disc on the shaft for engaging the traction wheel and means to move the upper end of the pivoted arm inwardly.

2. In a vehicle having a supporting traction wheel, an arm, a bracket, a universal joint connecting the bracket with the arm, a bearing on the arm, a shaft journaled in the bearing, a disc on the shaft for engaging the traction wheel, means to drive the shaft and means to move the pivoted arm in the direction of the supporting traction wheel to bring the disc into engagement with the latter.

3. In a vehicle having a traction wheel, a bracket disposed in the plane of rotation of the traction wheel, two arms pivoted at one set of ends to the bracket, the arms diverging away from their said ends, bearings at the other set of ends of the arms, two shafts one journaled in each of the bearings, discs on the shafts for engaging the traction wheel and means to move the upper ends of the pivoted arms inwardly.

4. In a vehicle having a traction wheel, a pivoted arm having a bearing, a shaft journaled in the bearing, a disc on the shaft for engaging the traction wheel, means to drive the shaft, steering means for the vehicle and means connected with the steering means for operating the pivoted arm.

5. In a vehicle having a traction wheel, an arm pivoted at one end and extending outwardly relatively to the traction wheel, a bearing at the other end of the arm, a shaft in the bearing, a disc on the shaft for engaging the traction wheel, a steering column movable relatively to the body of the vehicle, steering means connected with the steering column, and means connected with the steering column to be operated thereby for moving the said other end of the pivoted arm inwardly.

HENRY ELMER RIEHL.